United States Patent [19]

Renker et al.

[11] Patent Number: 4,924,593
[45] Date of Patent: May 15, 1990

[54] METHOD FOR ALIGNING A TWO-AXIS PLATFORM

[75] Inventors: Horst Renker, Zur Pfrille; Walter Bernard, Säntisblick, both of Fed. Rep. of Germany

[73] Assignee: Bodenseewek Geratetechnik GmbH, Uberlingen/Bodensee, Fed. Rep. of Germany

[21] Appl. No.: 329,986

[22] Filed: Mar. 29, 1989

[30] Foreign Application Priority Data

Mar. 29, 1988 [DE] Fed. Rep. of Germany ....... 3810617

[51] Int. Cl.$^5$ .............................................. G01C 19/38
[52] U.S. Cl. ..................... 33/324; 33/317 D
[58] Field of Search ................. 33/318, 320, 321, 322, 33/323, 324, 325, 326, 317 D

[56] References Cited

U.S. PATENT DOCUMENTS

| | | | |
|---|---|---|---|
| 3,938,256 | 2/1976 | Crocker, Jr. | 33/324 |
| 4,158,261 | 6/1979 | Auer | 33/324 |
| 4,379,365 | 4/1983 | Riethmüller et al. | 33/324 |
| 4,442,723 | 4/1984 | Auer | 33/324 |
| 4,584,426 | 7/1984 | O'Conner et al. | 33/325 |

FOREIGN PATENT DOCUMENTS

0048212 3/1982 European Pat. Off. .
2903282B1 6/1980 Fed. Rep. of Germany .
3050615C2 4/1984 Fed. Rep. of Germany .
3337715C2 9/1985 Fed. Rep. of Germany .

*Primary Examiner*—William A. Cuchlinski, Jr.
*Assistant Examiner*—William C. Dowling
*Attorney, Agent, or Firm*—Lee, Mann, Smith, McWilliams & Sweeney

[57] ABSTRACT

A two-axis platform comprises an azimuth gimbal rotatable about an azimuth axis. In the azimuth gimbal an inner gimbal is mounted about an axis. A two-axis gyro having input axes and a spin axis is located in the inner gimbal. The spin axis is always maintained horizontal by a torquer which is controlled by a level sensor. By the horizontal component of the rotary speed of the earth, which acts on the input axis of the gyro, the spin axis is rotated into North through the torquer. The azimuth angle of the spin axis is measured in a first position for elimination of the influence of gyro drifts including axial mass unbalance. Then, azimuth gimbal and inner gimbal are simultaneously rotated by 180° about their axes. Subsequently, the azimuth angle is measured again, to which the spin axis is adjusted. The middle between these positions provides a North indication compensated for gyro drifts. Furthermore, means for determination of errors due to deviations of the azimuth axis from the vertical are described.

6 Claims, 9 Drawing Sheets

METHOD FOR ALIGNING A TWO-AXIS PLATFORM

TECHNICAL FIELD

The invention relates to a method for aligning a two-axis platform comprising an azimuth gimbal rotatable about an azimuth axis, an inner gimbal rotatable relative to said azimuth gimbal about a second axis, a two-axis gyro mounted on said inner gimbal, wherein the platform, after pre-alignment with horizontal spin axis of the gyro, is rotated into a first position, in which the sum of the angular rates effective about one input axis becomes zero.

The invention also relates to a platform for carrying out this method.

BACKGROUND ART

Through DE-C2-33 37 715 a directional attitude reference device is known, in which a two-axis position gyro having a substantially horizontal spin axis is arranged on an inner gimbal. The position gyro has position pick-offs and torquers on the input axes. The inner gimbal is mounted in an azimuth gimbal about a substantially horizontal gimbal axis. The azimuth gimbal is, in turn, mounted rotatably on a base about a substantially vertical gimbal axis, the azimuth axis. The two gimbal axes are mutually orthogonal. The gimbal axis between inner gimbal and azimuth gimbal is perpendicular to the spin axis of the gyro. A first input axis of the gyro is parallel to the gimbal axis of the inner gimbal and perpendicular to the spin axis. The second input axis of the gyro is perpendicular to the first input axis and to the spin axis.

A level sensor responds to inclination of the inner gimbal relative to the horizontal about the first input axis.

A servo electronic system having pick-offs is provided at the gyro. The signals of this servo electronic system energize the servomotors such that the inner gimbal with a gyro housing is electrically restrained to the spin axis. By a first control loop, the measuring sensor of which is the level sensor, the spin axis of the gyro is always maintained horizontal. To this end the level sensor energizes a torquer acting about the second input axis. This torquer effects a deflection of the gyro about the first input axis. By means of the servo electronic system the position pick-off acting about the first input axis actuates, in turn, the inner gimbal such that the spin axis is maintained horizontal.

Furthermore, a second control loop is provided, the controlled quantity of which is the torque effective about the second input axis. This second control loop energizes the torquer acting about the first input axis, such that the azimuth gimbal is rotated through the servo electronic system into a position in which the angular rate effective about the first input axis becomes zero.

With the positional attitude reference device according to said DE-C2-33 37 715 a continuous deflection of the position gyro and a corresponding inclination of the inner gimbal is effected, when an angle between the spin axis of the gyro and North is present. The level sensor responds to this inclination. The signal from the level sensor is applied to the first control loop, an aligning controller. The output signal from this first control loop is applied as controlling signal to a torquer of the gyro and causes deflection of the gyro. This deflection effects, in turn, alignment of the spin axis with North through the corresponding pick-off and the servomotor controlled thereby and acting in azimuth.

The controlling signal applied to the torquer in the first control loop in the balanced state is stored. The servomotor acting in azimuth is adapted to be energized such that the inner gimbal subsequently is rotated in azimuth by a fixed angle. From the stored signal and the controlling signal obtained after the rotation, a signal is generated through a computer. This signal corresponds to the then present angle between spin axis and North. Subsequently, the servomotor acting about the azimuth axis is energized according to this signal such that the spin axis is aligned with North.

In the arrangement according to DE-C2 33 37 715 the problem is pre-aligning the spin axis of the gyro with North with a directional attitude reference device by using available components. The problem is not compensation for gyro errors.

A device for determination of North direction by means of a gyro influenced by the rotation of the earth is known through DE-B1-29 03 282. This gyro is two-axis. The spin axis of the gyro is vertical. Position pick-offs and torquers are arranged at two input axes perpendicular to each other and to the spin axis. The signal of each position pick-off associated with one input axis is applied to the torquer associated with the other axis, whereby the gyro is electrically restrained to the vertical with its spin axis. Through a North deviation computer the angle between one of the input axes and North direction is computed from the two signals which are applied to the torquers and which correspond to the components of the horizontal component of the rotary speed of the earth.

In DE-B1-29 03 282 the two signals are stored in a memory. Subsequently the gyro is rotated by 180° about its spin axis. In this rotated position the signals applied to the torquers are stored again. Then, for computing the North deviation, the sums and the differences of the associated stored signals are formed. Gyro errors are eliminated by this sum and difference formation.

A device for determination of North direction is known from DE-C2-30 50 615. This device comprises an azimuth gimbal which is rotatably mounted about an azimuth axis. A rate gyro is arranged at the azimuth gimbal, which rate gyro responds to components of the rotary speed of the earth and supplies corresponding signals. The spin axis of the rate gyro is located in a plane perpendicular to the azimuth axis. An input axis of the rate gyro extends in this plane perpendicular to the spin axis. The azimuth gimbal is rotatable by a servomotor into a 0°-position, a 90°-position, a 180°-position and a 270°-position. The signals obtained from the rate gyro are stored. North direction is determined by a computer from the stored signals. Therewith, gyro errors due to gyro drifts are compensated for by forming differences. Advantage is taken of the fact that, when the gyro is rotated by 180° the signals caused by the rotary speed of the earth change sign, that means that they are added when forming differences, while most of the gyro errors keep their sign after the rotation and thus are eliminated by the forming of differences.

EP-A1-0 048 212 describes a directional attitude reference device having a two-axis position gyro having the spin axis substantially horizontal on an inner gimbal. The inner gimbal is rotatably mounted in an azimuth gimbal about a pivot axis parallel to the first input axis of the position gyro. Two level sensors are located on the inner gimbal, two other level sensors are arranged housing-fixed. An angle sensor on the azimuth axis supplies an azimuth signal. The inner gimbal is decoupled from the movement of the support about two axis by servomotors which are controlled by pick-offs of the position gyro. The movement about the third axis is measured by a first level sensor and taken into account in the computer. Signals for compensation for the vertical component of the rotation of the earth are applied to torquers which act about the input axes on the position gyro. By applying the signal from the second level sensor to the torquers on the input axes of the position gyro this second level sensor is moved into horizontal position and the spin axis of the gyro is rotated into North direction.

US-A-4 458 426 shows a gyro compass having a gimbal which is rotatable about an upright axis and a gyro which is rotatably mounted in this gimbal about an inner axis extending crosswise to the upright axis. The gyro compass also comprises a level sensor which is located on the gimbal and supplies a level signal which corresponds to the tilting of the upright axis out of the vertical. A controller is connected to the level sensor. The controller responds to the level signal and rotates the gimbal into a initial position in which the level signal becomes zero. The gimbal is rotated until the level sensor indicates that the inner axis is horizontal. Then the torque is measured, which is exerted on the gyro by the horizontal component of the rotation of the earth when the spin axis of the gyro is rotated about the inner axis into a horizontal position. Subsequently, the gimbal is rotated by 180° and the torque is measured again, which is exerted on the gyro by the horizontal component of the rotation of the earth when the spin axis is brought again into a horizontal position about the inner axis.

DISCLOSURE OF INVENTION

It is the object of the invention to provide method of the type mentioned above for aligning a two-axis platform, such that compensation for gyro errors is effected.

According to the invention this object is achieved by the steps of:
(a) measuring the azimuth angle in said first position,
(b) rotating the azimuth gimbal and the inner gimbal simultaneously about the respective platform axes through 180° each,
(c) rotating the platform into a second position, in which again the sum of the angular rates effective about said input axis becomes zero, and
(d) measuring the azimuth angle in said second position,
(e) an angle representing North direction being obtained in the middle between the positions of the spin axes in the two positions.

According to the invention gyro errors are eliminated by rotating the platform. However, gyro errors exist, e.g. the drift caused by the axial mass unbalance, which cannot be eliminated just by rotation the platform about the azimuth axis. When the platform is rotated by 180° the signals due to the rotary speed of the earth change their sign, while e.g. the bias drift keeps its sign. Thus, the bias drift can be eliminated by forming differences. The drift of the gyro caused by an axial mass unbalance, however, likewise changes its sign after such a rotation about the azimuth axis. A rotation about the spin axis would be necessary to eliminate this drift.

However, such a rotation itself would require a very expensive three-axis platform because, with a two-axis platform the inner gimbal is not rotatable about the spin axis. Therefore, with the method according to the invention, the inner gimbal is simultaneously rotated about the two axes by 180°. It can be shown that the spin axis then is located in its original position but the two input axes of the gyro are rotated by 180° relative to their former positions.

When adjustment is effected in the two positions of the inner gimbal, such that the angular rates effective about the first input axis become zero, the true North direction can be determined eliminating the gyro errors.

A platform for carrying out the described method comprising
(a) an azimuth gimbal, which is mounted for rotation relative to a base about a substantially vertical azimuth axis,
(b) an inner gimbal, which is mounted for rotation in the azimuth gimbal about a second axis perpendicular to the azimuth axis and substantially horizontal,
(c) a first servomotor which is arranged to rotate the azimuth gimbal about the azimuth axis,
(d) a second servomotor which is arranged to rotate the inner gimbal about the second axis,
(e) a two-axis gyro having a spin axis, a first and a second input axis being parallel to said second axis of the platform, the spin axis being perpendicular thereto and substantially horizontal, and the second input axis being perpendicular to the spin axis and the first input axis,
(f) a pick-off and a torquer on each of the input axes of the gyro,
(g) a first level sensor which responds to the inclination of the inner gimbal relative to the horizontal about the first input axis,
(h) a servo electronic system, by which a gyro housing is caused electrically to follow-up the spin axis about two axes,
(i) a first control loop, the measuring sensor of which is the first level sensor and the final control element of which is the torquer acting about the second input axis, and by which the spin axis of the gyro is always maintained horizontal, and
(j) a second control loop comprising a controller to which a signal representing the angular rate about the first input axis is applied and which is arranged to energize the torquer acting about the first input axis such that the azimuth gimbal is rotatable into a first position in which the angular rate effective about the first input axis becomes zero,
is characterized according to the invention in that
(k) a control device is provided,
 (k$_1$) which is arranged to energize the two torquers such that they initiate 180°-rotations of the spin axis of the gyro both about the first input axis and about the second input axis,
 (k$_2$) which is arranged to actuate, thereafter, the first and second control loops to rotate the spin axis of the gyro, again with horizontal spin axis, into a second position in which, again, the angular rate effective about the first input axis of the gyro becomes zero,
 (k$_3$) the midpoint of the positions of the spin axis in the first and second positions providing an azimuth angle representing North direction unaffected of gyro drifts.

Modifications of the invention are subject matter of the sub-claims.

Such modifications particularly also refer to elimination of errors which arise because the azimuth axis is not arranged exactly vertical. By the measurement in two positions with intermediate 180-change of the two gimbals, four relations between known and four unknown quantities including the aligning error due to inclination are obtained, which allow calculation and correction of this aligning error due to inclination.

An embodiment of the invention will now be described in greater detail with reference to the accompanying drawings.

BEST MODE OF CARRYING OUT THE INVENTION

Figure 1:
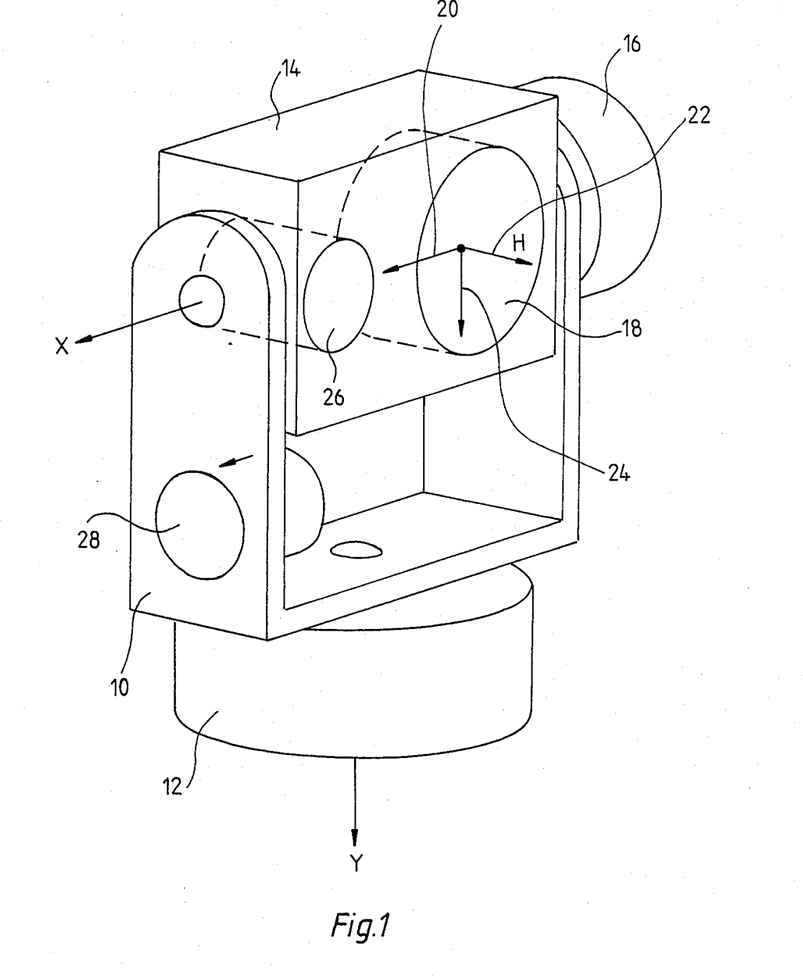
FIG. 1 is a schematic-perspective illustration of a platform having two-axis gyro and level sensors.

Numeral 10 designates an azimuth gimbal. The azimuth gimbal 10 is rotatable about an azimuth axis Y by means of a servomotor 12. An inner gimbal 14 is rotatably mounted about an axis X in the azimuth gimbal 10. The axis X extends perpendicular to the azimuth axis Y. The inner gimbal 14 is rotatable by a servomotor 16. A two-axis gyro 18 is located in the inner gimbal 14. A first input axis 20 of the gyro 18 is parallel to the axis X. The spin axis 22 of the gyro 18 is perpendicular to the first input axis 20 and substantially horizontal. A second input axis 24 of the gyro 18 extends perpendicular to the first input axis 20 and to the spin axis 22 and, thus, is substantially vertical and parallel to the azimuth axis Y.

A first level sensor 26 in the form of an accelerometer is located in the inner gimbal. The first level sensor 26 responds to the inclination of the inner gimbal 14 about the axis X relative to the horizontal. A second level sensor 28 in the form of an accelerometer is located in the azimuth gimbal 10. The axis of sensitivity of this accelerometer is parallel to the axis X. Thus, the level sensor 28 responds to the inclination of the axis X relative to the horizontal.

Figure 2:
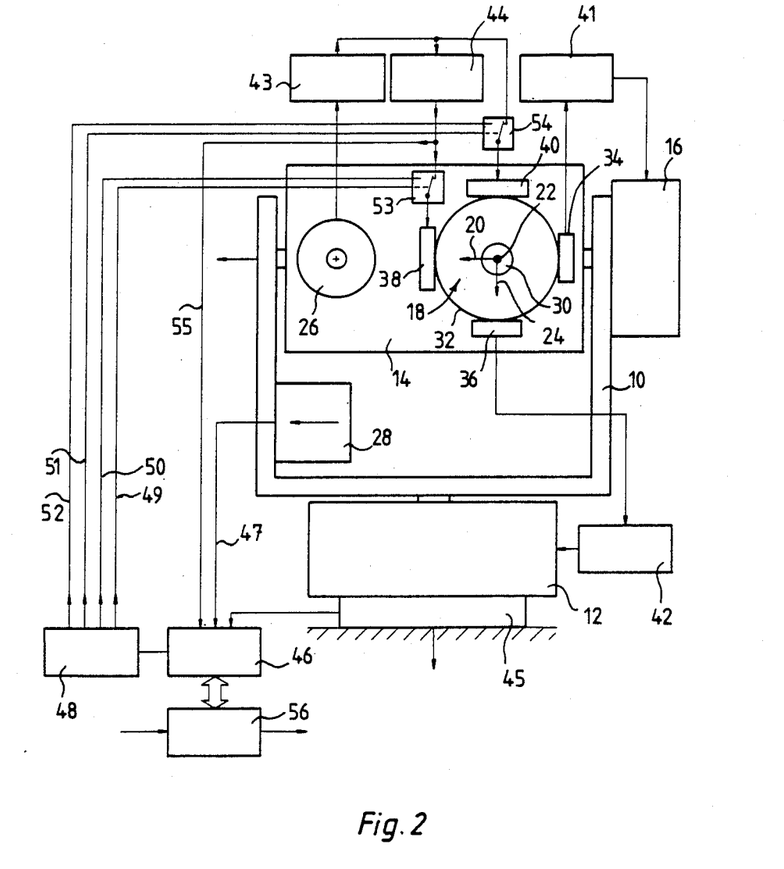
FIG. 2 is a block diagram and shows servo and control loops of the platform.

In FIG. 2 this arrangement is schematically illustrated once again. The position of the gyro rotor 30 of the gyro 18 relative to a gyro housing 32 fixed at the inner gimbal 14 is picked-off by pick-offs 34 and 36. Therein, the pick-off 34 picks off the deflection of the gyro rotor 30 about the first input axis 20. The pick-off 36 picks off the deflection of the gyro rotor 30 about the second input axis 24. Furthermore, torquers 38 and 40 are provided, which serve to exert torques on the gyro rotor 30 about the first and the second input axes 20 and 24, respectively.

A servo electronic system comprises a first controller 41 and a second controller 42. The signal from the pick-off 34 is applied at the controller 41. The output of the controller 41 is applied to the servomotor 16. When the inner gimbal 14 and thus the gyro housing 32 is deflected relative to the gyro rotor 30 by an angular rate about the input axis 20, the pick-off 34 supplies a signal and energizes the servomotor 16 through the first controller 41. Thereby the inner gimbal 14 and thus the gyro housing 32 are rotated relative to the azimuth gimbal about the first input axis 20. The gyro housing 32 is aligned again with the gyro rotor 30 and the deflection is compensated for. The signal from the pick-off 36 is applied to the controller 42. The output of the controller 42 is applied to the servomotor 12. When the azimuth gimbal is deflected relative to the gyro rotor 30 by an angular rate about the second input axis 24, the pick-off 36 supplies a signal and energizes the servomotor 12 through the second controller 42. Thereby the azimuth gimbal and thus the gyro housing 32 are rotated relative to a base about the azimuth axis and thus about the second input axis 24 parallel to the azimuth axis. Also here the gyro housing 32 is aligned again with the gyro rotor 30 and the deflection is compensated for.

A control loop is provided, through which the spin axis 22 of the gyro 18 always is maintained horizontal. This control loop comprises as measuring sensor the level sensor 26 which responds to inclination of the inner gimbal 14 relative to the horizontal. Because the inner gimbal 14 always is caused to follow-up the gyro rotor 30, this inclination is equal to the inclination of the spin axis relative to horizontal. The signal from the level sensor 26 is applied through a controller 43 to the torquer 40 acting about the second input axis 24. Thereby, a torque is generated on the gyro rotor 30 about the second input axis 24. This torque causes a precession of the gyro rotor 30 about the first input axis 24 until the spin axis 22 is horizontal. As described, the inner gimbal 14 is caused to follow-up the gyro rotor 30 such that also the signal from the level sensor 26 disappears when the spin axis 22 is horizontal.

A component of the rotary speed of the earth acts on the input axis 20. This component tends to deflect the spin axis 22 about the first input axis 20. Such deflections, however, are controlled to disappear by the just described control loop having the level sensor 26, the controller 43 and the torquer 40. To this end, a certain signal has to be applied to the torquer 40, at which the torque exerted by the torquer 40 balances the influence of the component of the rotary speed of the earth acting about the first input axis 20. This signal is proportional to said component. As illustrated in FIG. 2, a signal proportional to the signal at the torquer 40 is applied to a second controller 44. The output signal from the second controller 44 is applied to the torquer 38 acting about the first input axis 20. The torque of the torquer 38 provides a precession of the gyro rotor 30 about the second input axis 24. The spin axis 22 is always kept horizontal by the described control loop with the controller 43. The controller 42 causes the gyro housing 32 to follow-up the precessing gyro rotor 30 about the second input axis 24. The precession of the gyro rotor 30 causes the gyro 18 to rotate into East-West-direction, the component of the rotary speed of the earth acting about the input axis 20 being the smaller the more the input axis 20 approaches the East-West-direction. When the input axis 20 is directed to East or West, the component of the rotary speed of the earth falling into the direction of the input axis 20 becomes zero. Then the spin axis 22 points to North or South.

These are idealized conditions. It is assumed that the azimuth axis is exactly vertical such that the vertical component of the rotary speed of the earth is not acting on the input axis 20. Furthermore, the gyro drifts are not taken into account. These idealized conditions are not present in practice. Thus, the spin axis 22 of the gyro will be located in a position in which, in fact, the sum of the angular rates effective about the first input axis becomes zero, which, however, differs from North direction.

In the arrangement according to FIG. 2 an angle sensor 45 is provided, which picks off the position of the azimuth gimbal 10 and supplies a corresponding signal.

The signal from the level sensor 28 measuring the inclination of the axis X relative to the horizontal is applied to a memory 46 through a line 47. The memory 46 is energized by a control device 48 to receive signals.

The control device 48 is also adapted to energize the torquers 38 and 40, as indicated by lines 49,50 and 51,52, respectively, and by switches 53 and 54 controlled through the lines 49 and 51, respectively. This energization is effected such that simultaneously the azimuth gimbal 10 is rotated by 180° about the azimuth axis Y and the inner gimbal 14 is rotated by 180° about the axis X relative to the azimuth gimbal. The signals from the angle sensor 43 and from the level sensor 26 can serve as position feed back. Another possibility is to apply a certain control current to the torquers 38 and 40 for a certain time. The current flows through the lines 50 and 52, while the duration of the current is determined by signals on the lines 49 and 51. Before and after this gimbal change the spin axis 22 of the gyro 18 and thus the platform are adjusted into a position (North direction in the ideal case), in which the sum of the angular rates effective about the first input axis 20 becomes zero. Generally, the gyro 18 and the platform will be adjusted to different positions, a first position and a second position. The control device 47 causes the signals from the controller 44 to be stored. These signals are proportional to the angular rate about the second input axis 24 and applied to the memory 46 through a line 55, and to the signals from the level sensor 28 in these two positions. As indicated, the stored signals are applied to signal processing means 56.

FIGS. 3 to 7 illustrate the "double gimbal change" by showing the paths which are described by the ends of the unit vectors pointing in the direction of the spin axis 22 and the two input axes 20 and 24 on a spherical surface 62, and by showing the intermediate positions occupied, during this gimbal change, by these unit vectors. Numeral 64 designates the path of the unit vector 66 pointing in the direction of the spin axis 22. The unit vector 68 pointing in the direction of the first input axis 20 describes a path 70. The unit vector 72 pointing in the direction of the second input axis 24 describes a path 74. If the initial point 76 of the unit vector 72, that means the intersection of the second input axis 24 with the sphere before the change, is considered to be the "South Pole" of the sphere 62, then the path 70 extends along half of the "equator" from a "West point" 78 to an "East point" 80. The West point 78 is the initial point of the unit vector 68, that means the intersection of the first input axis 20 with the sphere 62 before the change. The path 74 extends spirally from the "South Pole" 76 through the "East point" 80 to the "North Pole" 82, that means to the point diametrically opposite the "South Pole" 76. The path 64 of the unit vector 66 pointing in the direction of the spin axis 22 is a leaf-shaped curve. It starts from a point 84 located on the "equator" halfway between West point 78 and East point 80, passes through the "North Pole" 82 and then returns to the point 84 symmetrically to a "90°-meridian" 86 extending through the "North Pole" 82 and the point 84.

Figure 3:
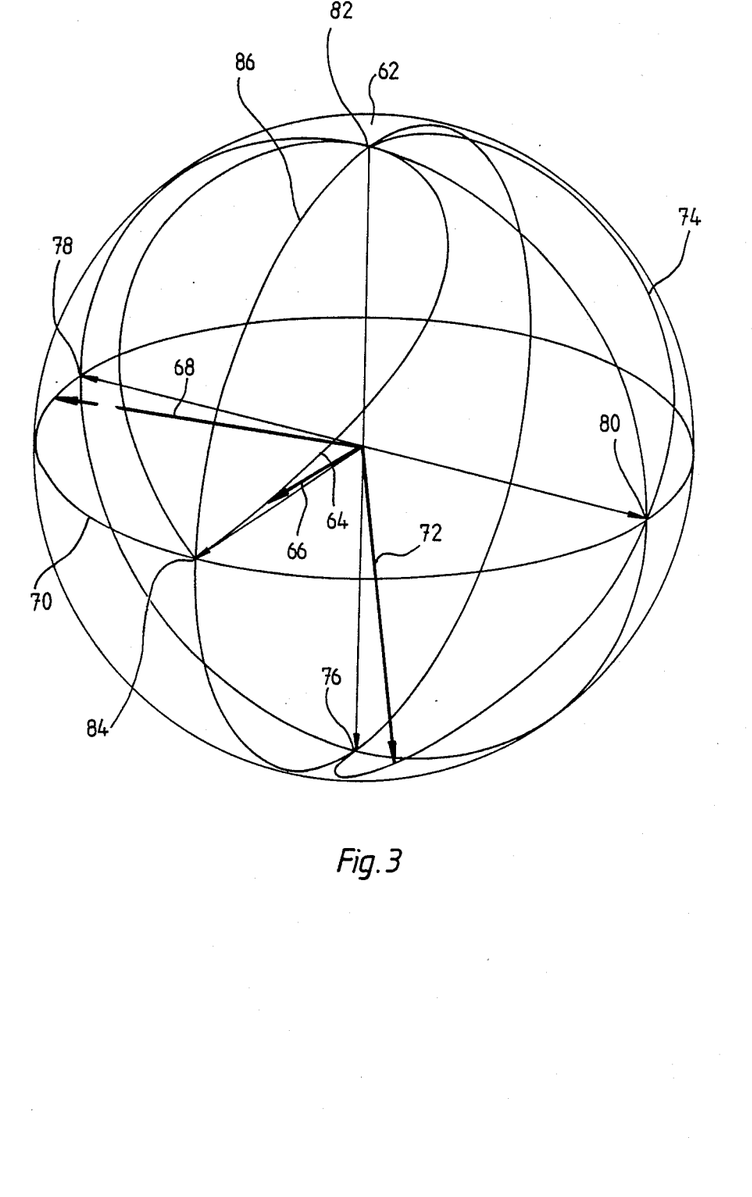
FIGS. 3 to 7 are schematic-perspective illustrations and show the movement of the spin axis and the two input axes of the gyro during a double gimbal change of the platform.
Figure 4:
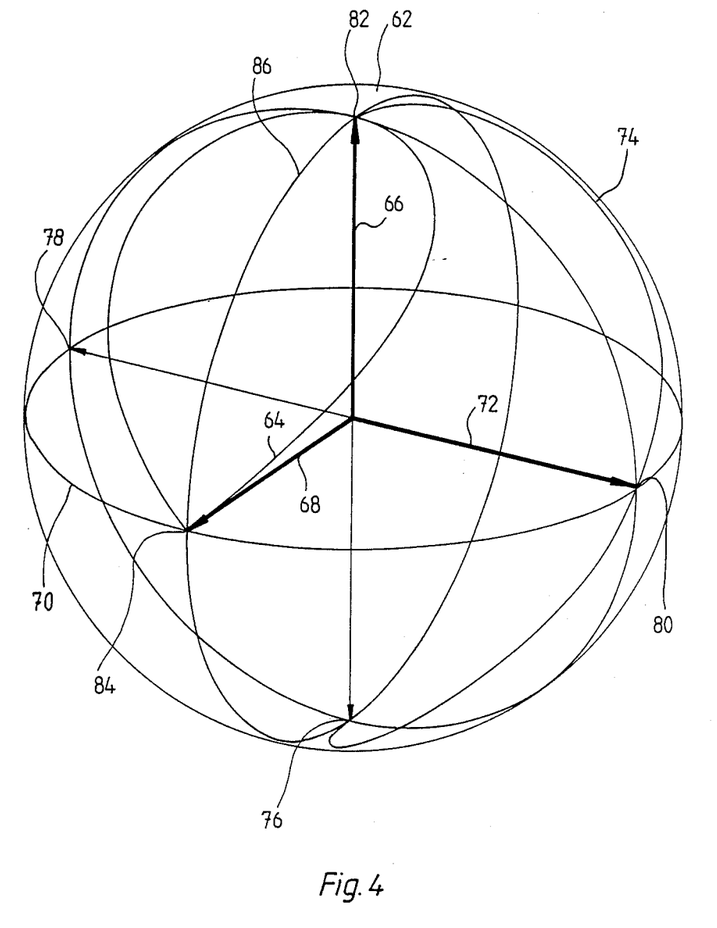
Figure 5:
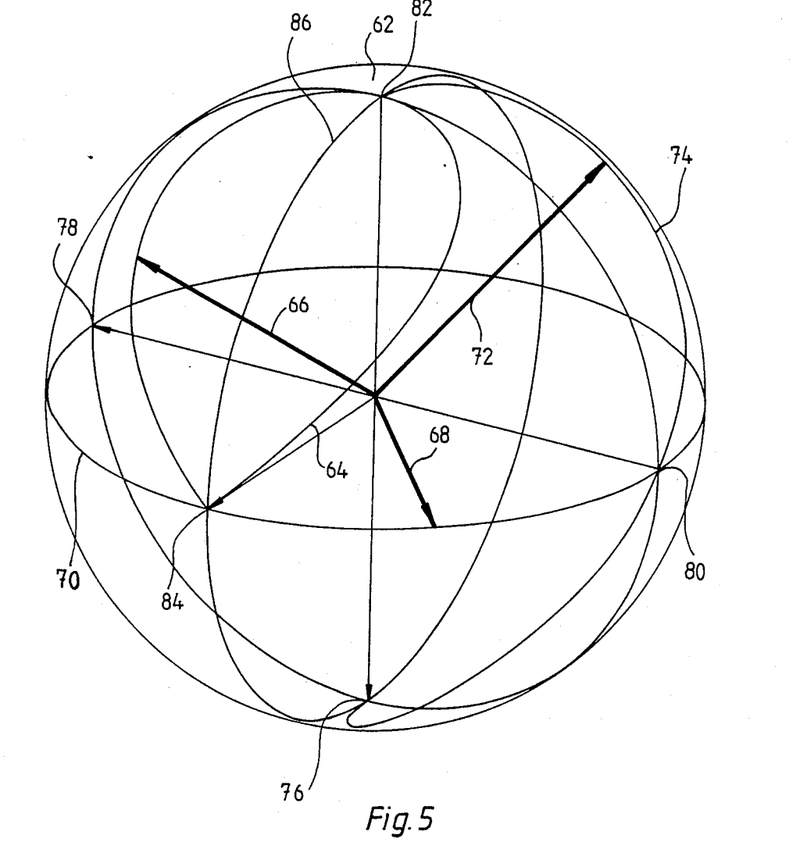
Figure 6:
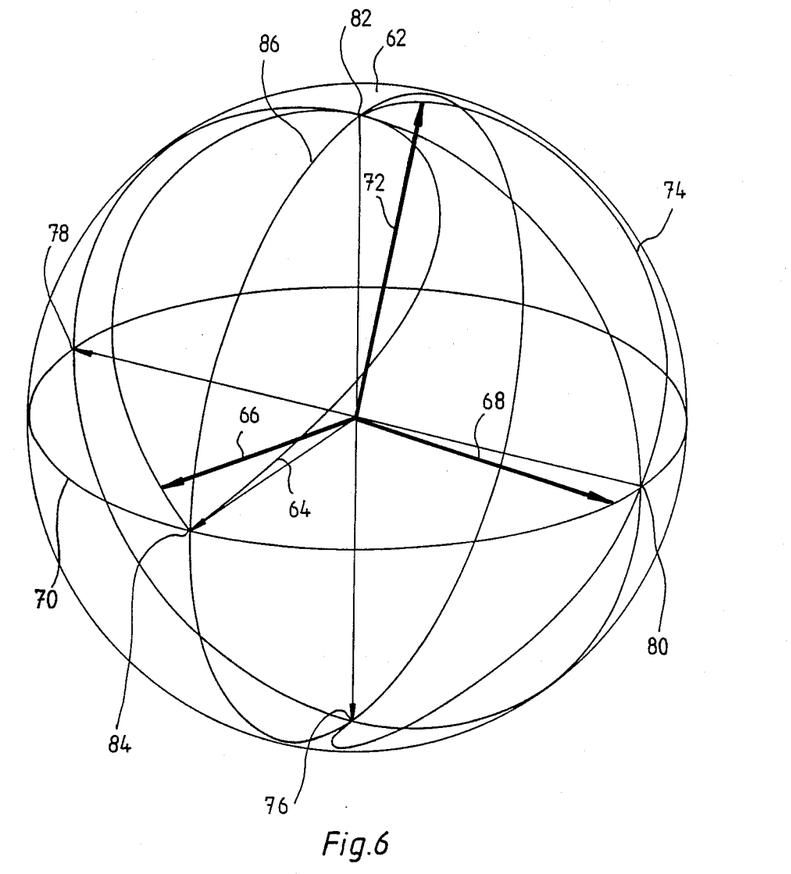
Figure 7:
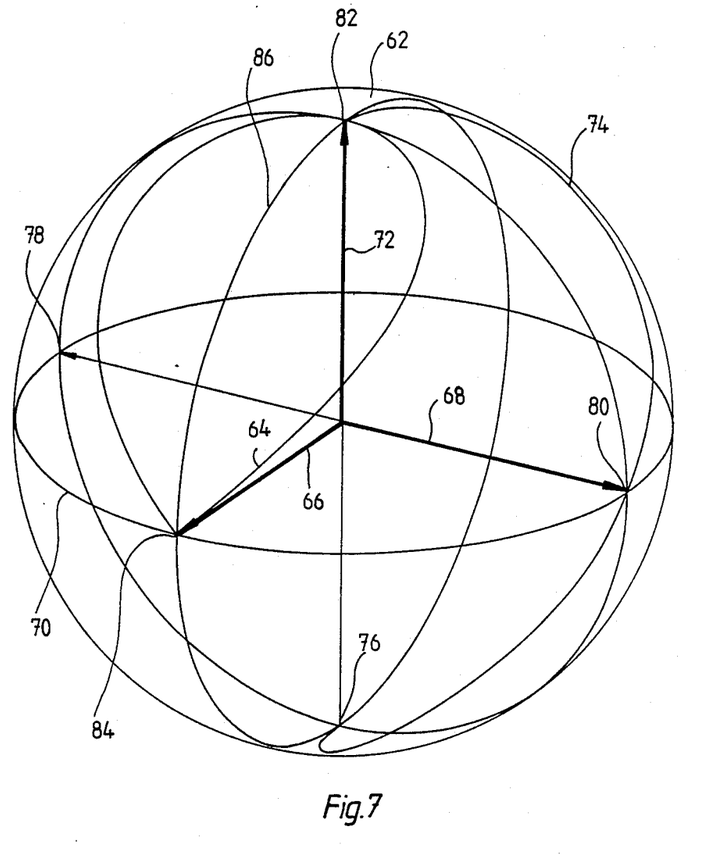

In all of the figures, the initial positions of the three unit vectors 66,68,72 and the positions of the spin axis 22 and the two input axes, respectively, before the change are illustrated as reference. FIG. 3 shows the three unit vectors 66,68 and 72, which naturally remain orthogonal, in the initial phase of the change. FIG. 4 shows the intermediate position: The unit vector 68, corresponding to the first input axis 20 and to the axis X, is moved along the "equator" to the point 84 after a 90°-rotation of the servomotor 12. The spin axis 22 and the unit vector 66 point to the "North Pole" 82 after a simultaneous 90°-rotation of the servomotor 16. The unit vector 72 representing the second input axis 24 is perpendicular to the unit vectors 66 and 68 and therefore points to the "East point" 80. FIG. 5 shows a further intermediate position: The unit vector 68 is moved further along the "equator" and is located between point 84 and "East point" 80. The unit vector 66 representing the spin axis 22 is moved from the "North Pole" 82 on the second half of the path 64 in the direction toward its initial position again, that means in the direction toward the point 84. The unit vector 72 representing the second input axis 24 is moved from the "East point" 80 in the direction toward the "North Pole" 82. FIG. 6 shows the situation shortly before the end position is attained, that means the "second position" attained after the change: The unit vector 68 approaches its initial position in the point 84. The unit vector 68 approaches the "East point" 80, that means a position diametrically opposite its initial position. The unit vector 72 approaches the "North Pole" 82, that means likewise a position diametrically opposite its initial position. Finally, FIG. 7 illustrates the end position in the "second position" of the platform after the double change.

Thus, the final result is the same as that, which would have been achieved with a direct rotation of the gyro 18 about the spin axis 22. Such a direct rotation, however, is not possible with a two-axis platform.

The rotation effective about the spin axis makes it possible to compensate for gyro drifts due to axial mass unbalances of the gyro rotor. When the gyro 18 is rotated about the spin axis 22, the first input axis 20 gets into a position angularly offset by 180° relative to the initial position. This is the same with a double change of the described type. Therewith, the sign of the component of the horizontal component of the rotary speed of the earth detected by the first input axis is inversed. With direct rotation of the gyro about the spin axis, which would require a three-axis platform, as well as with the double change, the end position of the spin axis including the direction of the spin vector is identical with the initial position. Therefore, the sign of a drift due to axial mass unbalance remains the same in the first and the second positions. Therefore, the influence of such a drift due to mass unbalance can be eliminated by forming differences. When, according to FIG. 2, the azimuth gimbal is caused to follow-up rotationally until the angular rate occuring on the first input axis 20 disappears, the gyro drifts cause the spin axis 22 to deviate from North direction in this followed-up state. In the first position of the platform, this deviation is oppositely equal to the deviation appearing in the second position of the platform after the change. Therefore, when the azimuth axis is exactly vertical, North direction is located in the middle between the two positions of the spin axis 22 in the first and the second positions of the platform.

This differs from a 180°-rotation about the azimuth axis only. With such a 180°-rotation the first input axis 20 is, indeed, rotated by 180° such that the signs of the detected angular rate components are inversed. However, also the direction of the spin vector of the gyro and the position of the center of mass of the gyro rotor 30 relative to the intersection point of the input axes 20 and 24 are inverted such that also the sign of the gyro drift due to axial mass unbalance is changed. Therefore, the influence of this gyro drift cannot be eliminated just by such a rotation and by forming differences.

The bias drift of the gyro likewise maintains its sign with the double change. Therefore, it can be taken into account in the same manner as the drift due to axial mass unbalance by combination of the measurements in the first and the second position. When the azimuth axis is exactly vertical, the middle between the first and second position of the spin axis 22 exactly represents North direction.

However, a further source of errors for the determination of North direction results from the fact that in many cases the azimuth axis Y is not exactly vertically aligned. Then, a component of the vertical component of the rotary speed of the earth is effective at the first input axis 22 in addition to a component of the horizontal component of the rotary speed of the earth. Then, the gyro is adjusted with its spin axis such that the sum of the components of horizontal and vertical component of the rotary speed of the earth becomes zero at the first input axis 20. Then, the spin axis 22 or the middle of the two positions of the spin axis does not exactly point to North direction. When, however, in addition, the inclination angles $\delta_1$ and $\delta_2$ which are measured by the level sensor 28 in the first and the second positions of the platform, and the angular rates measured about the second input axis in the first and the second positions are made use of, the angle by which angle the middle of the two positions of the spin axis 22 in the two positions of the platform deviates from North direction can be calculated from these quantities. The calculation of this angle $\psi$ is effected by the signal processing means 60.

The relation between this angle $\psi$ and the two angular rates $\omega_{y1}$ and $\omega_{y2}$ measured about the second input axis as well as the inclination angles $\delta_1$ and $\delta_2$ of the axis X in the two positions of the platform results from the following reflections with reference to FIGS. 7 to 10.

Figure 8:
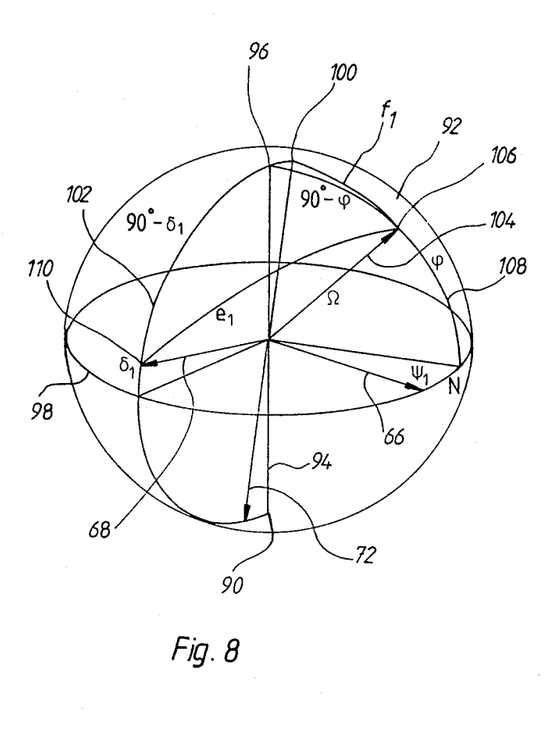
FIG. 8 is a schematic-perspective illustration of the spin axis and the input axis of the gyro when inclination and gyro errors are taken into consideration in the first position.
Figure 9:
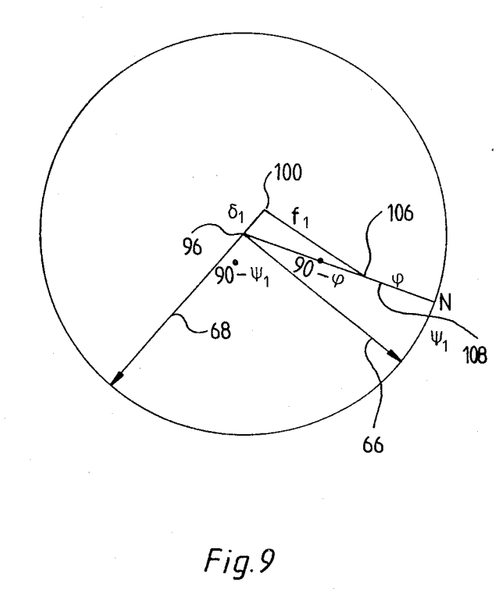
FIG. 9 is a plan view of FIG. 8.

In FIG. 8 the positions of the axes and the vectors in the first position are again illustrated on a sphere similarly to FIG. 3 to 7.

Numeral 90 designates the "South Pole" of the sphere 92, this "South Pole" being defined by the vertical 94 from which, in the general case, the input axis 24 illustrated by the unit vector 72 deviates. Correspondingly, the rear prolongation of the unit vector 72 deviates from the "North Pole" 96 defined by the vertical. The "equator" 98 of the sphere 92 represents the horizontal. The unit vector 68 representing the first input axis 20 forms an angle $\delta_1$ with the horizontal in the first position of the platform. The rear prolongation of the unit vector 72 intersecting the sphere 92 in a point 100 is displaced relative to the "North Pole" 96 by the same angle. Numeral 102 designates a "meridian" which extends through the end point of the unit vector 68. N designates North direction. The spin axis 22 represented by the unit vector 66 deviates from North direction but is horizontal due to the described control. The direction of the vector of the rotary speed of the earth $\Omega$ is illustrated by a unit vector 104. The tip of the unit vector 104 is located in point 106. A "meridian" 108 extends through North direction N. The vector of the rotary speed of the earth is parallel to the earth axis. Therefore, it is located in the meridian plane toward North and forms an angle $\phi$ with the horizontal, $\phi$ being latitude. Also the unit vector 104 forms this angle 98 with the equator plane of the sphere 92.

A component $\omega_{ex}$ and $\omega_{ey}$, respectively, of the rotary speed of the earth $\Omega$, a component $\omega_{mx}$ and $\omega_{my}$, respectively, of the drift due to the axial mass unbalance $\omega_M$ and a constant bias drift $\omega_{bx}$ and $\omega_{by}$, respectively, act about each input axis 20 and 24. Thus, when the further index "1" characterizes the quantities for the first position of the platform, it holds that $$\omega_{x1} = \omega_{ex1} + \omega_{mx1} + \omega_{bx} = \Omega\cos e_1 + \omega_M\sin\delta_1 + \omega_{bx} \quad (1)$$

$$-\omega_{y1} = \omega_{ey1} + \omega_{my1} - \omega_{by} = \Omega\cos f_1 + \omega_M\cos\delta_1 - \omega_{by} \quad (2)$$

Therein, $e_1$ is the angle between the unit vector 104 representing the rotary speed of the earth and the unit vector 68 representing the first input axis 20, and $f_1$ is the angle between the unit vector 104 and the rear prolongation of the unit vector 72 or the second input axis 24.

The angle $e_1$ is one side of a spherical triangle, the corners of which are formed by the North Pole 96, the point 106 and the end point 110 of the vector 68.

The two other sides of this triangle are $90°-\delta_1$ and $90°-\phi$. The angle encircled by these sides is $90°+\psi_1$. According to the law of cosine of the spherical geometry it is $$\cos e_1 = \sin\phi\sin\delta_1 - \cos\phi\cos\delta_1\sin\psi_1 \quad (3)$$

The side $f_1$ of the spherical triangle which is formed by the North Pole 96, the intersection 100 of the rear prolongation of the first input axis 20 with the sphere 92 and the point 106 results in similar way. In this spherical triangle one side is $90°-\phi$, one side is $\delta_1$ and the encircled angle is $90°-\psi_1$. Then, the law of cosine of the spherical trigonometry results in $$\cos f_1 = \sin\phi\cos\delta_1 + \cos\phi\sin\delta_1\sin\psi_1 \quad (4)$$

Figure 10:
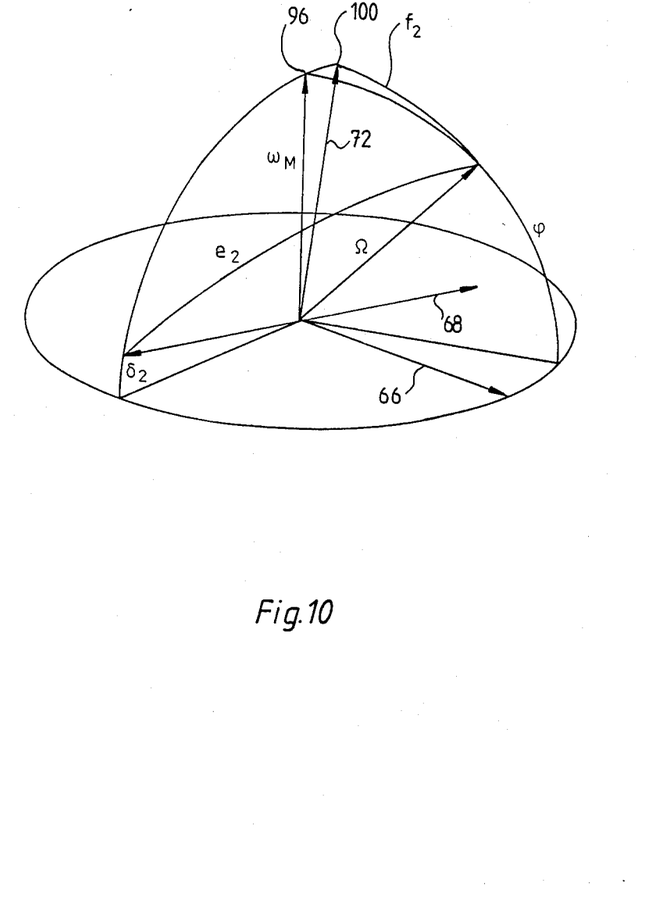
FIG. 10 is a schematic-perspective illustration similar to FIG. 8 in the second position of the gyro.

As can be derived from FIG. 10, it results in similar way for the second position:

$$-\omega_{x2} = \Omega\cos e_2 + \omega_M\sin\delta_2 - \omega_{bx} \quad (5)$$

$$\omega_{y2} = \Omega\cos f_2 + \omega_M\cos\delta_2 + \omega_{by} \quad (6)$$

$$\cos e_2 = \sin\phi\sin\delta_2 - \cos\phi\cos\delta_2\sin\psi_2 \quad (7)$$

$$\cos f_2 = \sin\phi\cos\delta_2 + \cos\phi\sin\delta_2\sin\psi_2 \quad (8)$$

With the equations (1), (2), (5) and (6), four equations are available for the determination of the four unknown quantities $\omega_M$, $\omega_{bx}$, $\omega_{by}$ and $\psi$, $$\psi = \frac{\psi_1 + \psi_2}{2} \quad (9)$$

being the deviation of the middle of the two positions of the spin axis determined in the first and the second position of the platform from North direction. It yields for this deviation $$\psi = \arc\sin \frac{(\omega_{y2} - \omega_{y1}) \sin \frac{\delta_1 + \delta_2}{2}}{\Omega \cos\phi} \quad (10)$$

It can be seen that this deviation disappears when the azimuth axis is exactly vertical. Then, $\delta_1$ and $\delta_2$ are zero and $\omega_{y2} = \omega_{y1}$. Then, the middle between the two positions of the spin axis directly provides North direction.

The described determination of the angle $\psi$ is effected by the signal processing means 60. Subsequently, in the described way through energizing the torquer 38, the control device 54 initiates a rotation of the azimuth gimbal 10 by the servomotor 12 in view of the angle $\psi$ determined by the signal processing means, such that the spin axis 22 of the gyro 18 is aligned with North direction.

With known methods in which just a rotation about the azimuth axis is effected, only two equations results for the four unknown quantities.

We claim:

1. A method for aligning a two-axis platform comprising an azimuth gimbal (10) rotatable about an azimuth axis (Y), an inner gimbal (14) rotatable relative to said azimuth gimbal (10) about a second axis (X), two-axis gyro (18) mounted on said inner gimbal, wherein the platform, after pre-alignment with horizontal spin axis (22) of the gyro (18), is rotated into a first position, in which the sum of the angular rates effective about one input axis (20) becomes zero, characterized by the steps of
   (a) measuring the azimuth angle in said first position,
   (b) rotating the azimuth gimbal (10) and the inner gimbal (14) simultaneously about the respective platform axes (Y or X, respectively) through 180° each,
   (c) rotating the platform into a second position, in which again the sum of the angular rates effective about said input axis (20) becomes zero, and
   (d) measuring the azimuth angle in said second position,
   (e) an angle representing North direction being obtained in the middle between the positions of the spin axes in the two positions.

2. Method as claimed in claim 1, characterized in that
   (a) in addition, the inclination of the inner gimbal (14) relative to the horizontal about an axis orthogonal to the azimuth axis (Y) and the second axis (X) is measured by means of an inclination meter (28), and the inclination measuring values are stored,
   (b) the angular rates about the second input axis (24) are measured in said first and said second positions, by means of the gyro (18) and the angular rate measuring values are stored, and
   (c) a measuring value is derived from the stored inclination measuring values and angular rate measuring values such that this measuring value represents the angular deviation between the middle of said two positions of the spin axis (22) and North direction due to the inclination.

3. Method as claimed in claim 2, characterized by the further step of:
   (d) rotating the spin axis (22) in accordance with said measuring value such that the spin axis (22) is aligned with North direction.

4. Method as claimed in claim 2, characterized in that said measuring value for the angular deviation due to the inclination of $$\psi = \frac{\psi_1 + \psi_2}{2}$$

is determined in accordance with the relation $$\psi = \arc\sin \frac{(\omega_{y2} - \omega_{y1}) \sin \frac{\delta_1 + \delta_2}{2}}{\Omega \cos\phi}$$

wherein
   $\psi_1$ and $\psi_2$ are the azimuth angles of the spin axis in the first and the second position, respectively, referenced to North direction,
   $\omega_{y1}$ and $\omega_{y2}$ are the angular rates effective about the second input axis of the gyro in said first and second positions, respectively,
   $\delta_1$ and $\delta_2$ are the inclinations of the platform measured by the level sensor in said first and second positions, respectively,
   $\Omega$ is the angular rate of the earth, and
   $\phi$ is latitude.

5. Platform for carrying out the method claimed in claim 1, comprising
   (a) an azimuth gimbal (10), which is mounted for rotation relative to a base about a substantially vertical azimuth axis (Y),
   (b) an inner gimbal (14), which is mounted for rotation in the azimuth gimbal (10) about a second axis (X) perpendicular to the azimuth axis (Y) and substantially horizontal,
   (c) a first servomotor (12) which is arranged to rotate the azimuth gimbal (10) about the azimuth axis (Y),
   (d) a second servomotor (16) which is arranged to rotate the inner gimbal (14) about the second axis (X),
   (e) a two-axis gyro (18) having a spin axis (22), a first and a second input axis (20 and 24, respectively), said first input axis (20) being parallel to said second axis (X) of the platform, the spin axis (22) being perpendicular thereto and substantially horizontal, and the second input axis (24) being perpendicular to the spin axis (22) and the first input axis (20),
   (f) a pick-off (34,36) and a torquer (38,40) on each of the input axes (20,24) of the gyro (18),
   (g) a first level sensor (26) which responds to the inclination of the inner gimbal (14) relative to the horizontal about the first input axis (20),
   (h) a servo electronic system (34,41,16;36,42,12), by which a gyro housing (32) is caused electrically to follow-up the spin axis (22) about two axes,
   (i) a first control loop (46), the measuring sensor of which is the first level sensor (26) and the final control element of which is the torquer (40) acting about the second input axis (24), and by which the spin axis (22) of the gyro (18) is always maintained horizontal, and
   (j) a second control loop (44,38) comprising a controller (44) to which a signal representing the angular rate about the first input axis (20) is applied and which is arranged to energize the torquer (38) acting about the first input axis (20) such that the azimuth gimbal (10) is rotatable into a first position in which the angular rate effective about the first input axis (20) becomes zero, characterized in that (k) a control device (54) is provided, (k₁) which is arranged to energize the two torquers (38,40) such that they initiate 180°-rotations of the spin axis (22) of the gyro (18) both about the first input axis (20) and about the second input axis (24), (k₂) which is arranged to actuate, thereafter, the second control loop to rotate the spin axis (22) of the gyro (18), again with horizontal spin axis (22), into a second position in which, again, the angular rate effective about the first input axis (20) of the gyro (18) becomes zero, (k₃) the midpoint of the positions of the spin axis (22) in the first and second positions providing an azimuth angle representing North direction unaffected of gyro drifts.

6. Platform as claimed in claim 5, characterized in that (l) a second level sensor (28) responds to inclination of the azimuth gimbal (10) relative to the horizontal about an axis perpendicular to the azimuth axis (Y) and to the second axis (X) of the platform, and (m) the control device (48) is arranged to initiate storing of the inclination measuring values of the second level sensor (28) in the memory (46), (n) the gyro (18) provides an angular rate measuring value representing angular rate about the second input axis (24), (o) the control device (48) is arranged to initiate storing of these angular rate measuring values in the first and the second positions in the memory (46), (p) the stored measuring values are applied to signal processing means (56), and these signal processing means (56) are adapted to provide an output signal which represents the angular deviation of the midpoint between the two positions of the spin axis (22) from North direction due to said inclination.

* * * * *